United States Patent [19]
Welton

[11] Patent Number: 5,713,191
[45] Date of Patent: Feb. 3, 1998

[54] MONOFILAMENT LINE BASED CUTTER ASSEMBLY

[75] Inventor: Michael Welton, Sacramento, Calif.

[73] Assignee: Gopher Products, LLC, Wilton, Calif.

[21] Appl. No.: 518,271

[22] Filed: Aug. 23, 1995

[51] Int. Cl.⁶ .................................................. A01D 34/68
[52] U.S. Cl. .................. 56/12.1; 56/12.7; 56/16.7; 56/DIG. 17; 56/255; 30/276
[58] Field of Search .................. 56/12.1, 12.7, 56/16.7, 255, 295, DIG. 17, DIG. 20; 30/276

[56] References Cited

U.S. PATENT DOCUMENTS

| | | |
|---|---|---|
| 4,232,505 | 11/1980 | Walto .................................. 56/12.7 |
| 4,869,055 | 9/1989 | Mickelson ......................... 56/12.7 |
| 4,905,465 | 3/1990 | Jones et al. ..................... 56/12.7 X |
| 4,909,024 | 3/1990 | Jones et al. ..................... 56/12.7 X |
| 4,936,884 | 6/1990 | Campbell ......................... 56/295 X |
| 5,313,770 | 5/1994 | Smothers .......................... 30/276 X |

*Primary Examiner*—Terry Lee Melius
*Attorney, Agent, or Firm*—Mark C. Jacobs

[57] ABSTRACT

A replacement cutting head for a bump head cutter of a string trimmer which replacement head can also be utilized as a blade assembly replacement for a power lawn mower. The cutting head is conventionally attached to the drive shaft of the tool, and it features a whirling disk having a plurality of heavy gauge flexible members attached thereto. These members extend outwardly due to centrifugal force upon actuation of the tool and which due to the high rotational speed of the cutting head, cut through plants of all kinds.

6 Claims, 3 Drawing Sheets

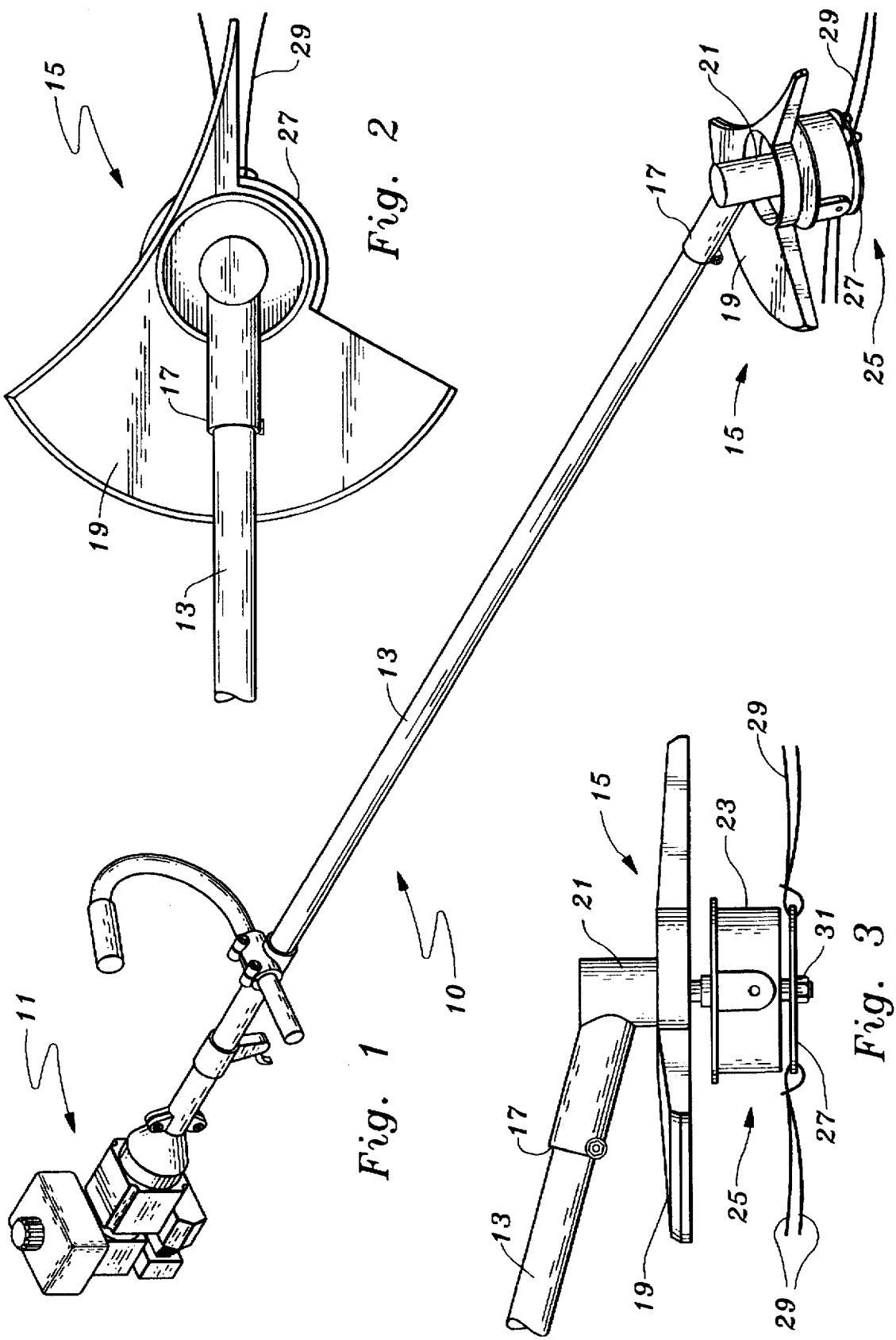

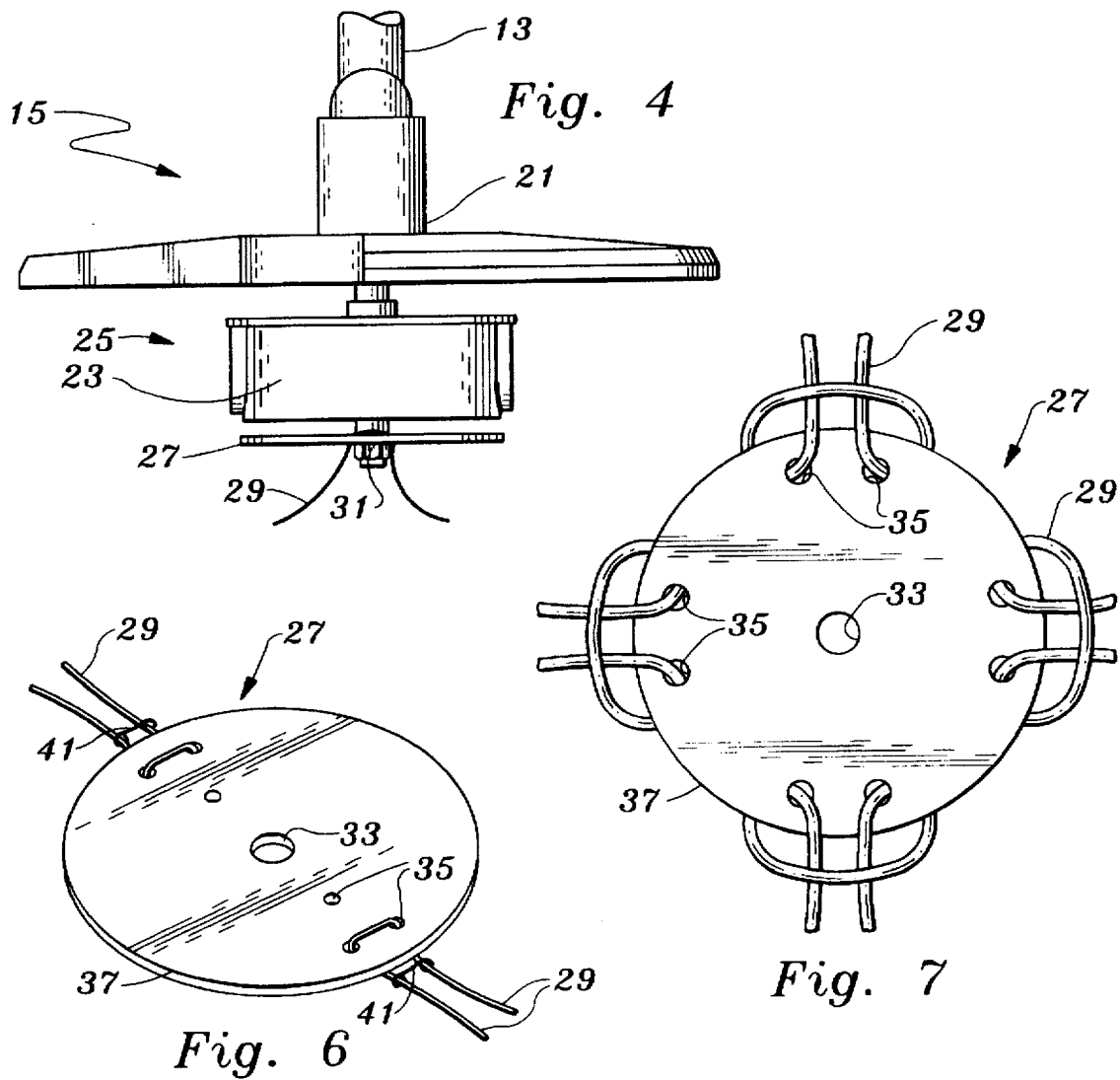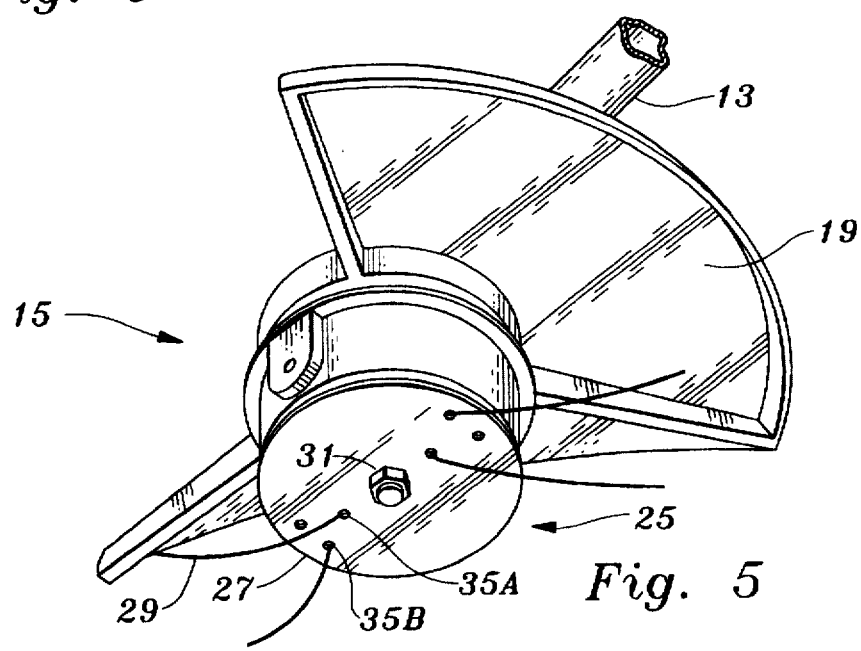

MONOFILAMENT LINE BASED CUTTER ASSEMBLY

BACKGROUND OF THE INVENTION

While most lawn mowers available today utilize a rotating cutting blade to cut the grass and weeds, lawn mowers that employ flexible nonmetallic filament as the cutting element have been around for about ten years. Among those known to exist in the prior art are U.S. Pat. Nos. 4,232,505; 4,250,623; and 4,452,033.

It is also known to use whirling flexible filament as a weed cutting head. Such items are known in the marketplace as "string trimmers" and are sold under such trademarks as Weedwhacker® and Weedeater® among others.

The problem with the monofilament cutting heads available today is the all too frequent breakage of the line and the need to rethread the line into the often complex head arrangement.

A preliminary search by applicant provided the following U.S. patents:

U.S. Pat. No. 4,176,508 Baumann et al.
U.S. Pat. No. 4,295,324 Frantello et al.
U.S. Pat. No. 4,781,014 Conboy et al.
U.S. Pat. No. 5,174,100 Wassenberg None of these references, either alone or in any combination thereof, anticipate(s) the present invention, nor renders this invention obvious to one of ordinary skill in this field of endeavor.

It is an object therefore to provide a monofilament based cutting head suitable for use on both a string trimmer and for a lawn mower.

It is another object to provide a cutting head that is easy to thread for usage.

It is yet another object to provide a cutter assembly having a cutting head that employs a heavier gauge of monofilament line for the cutting material relative to the prior art.

It is a further object to provide a generally universal cutting head adapted to fit most brands of string based lawn mowers.

It is a still further object to provide a generally universal cutting head adapted to fit most brands of string trimmers.

It is a yet further object to provide a cutting head that replaces the conventional bump head of a line or string trimmer.

Other objects of the invention will in part be obvious and will in part appear hereinafter.

The invention accordingly comprises the apparatus possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

The invention comprises a replacement cutting head for a string trimmer which replacement head can also be utilized as a blade assembly replacement for a power lawn mower. On a string trimmer the conventional bump head is replaced by the apparatus of this invention. The cutting head, which is conventionally attached to the drive shaft of the tools aforementioned, features a whirling disk having a plurality of heavy gauge flexible polymeric members attached thereto. These members extend outwardly due to centrifugal force upon actuation of the tool and which due to the high rotational speed of the cutting head, cut through plants of all kinds. The preferred flexible members have a diamond cross section rather than a round cross section to enhance cut capability.

BRIEF DESCRIPTION OF THE FIGURES

FIG. 1 is a perspective view of a typical string trimmer available in the marketplace, but with the cutting head of this invention attached to the bumphead, the details of the cutting heading of which are not visible.

FIG. 2 is a top plan view of the cutter portion of a string trimmer, and the cutting head of this invention mounted therein.

FIG. 3 is a side elevational view of a string trimmer with the cutting head of this invention mounted thereto.

FIG. 4 is a rear elevational view of the cutting head portion of a string trimmer with the current invention in place.

FIG. 5 is a bottom perspective view of the cutter portion with the cutting head of this invention mounted in place.

FIG. 6 is a close-up view of the bottom plate of the cutting head of this invention.

FIG. 7 is a bottom plan view of the cutting plate of this invention with one flexible member secured into operative position.

DESCRIPTION OF THE PREFERRED EMBODIMENT

Figure 8:
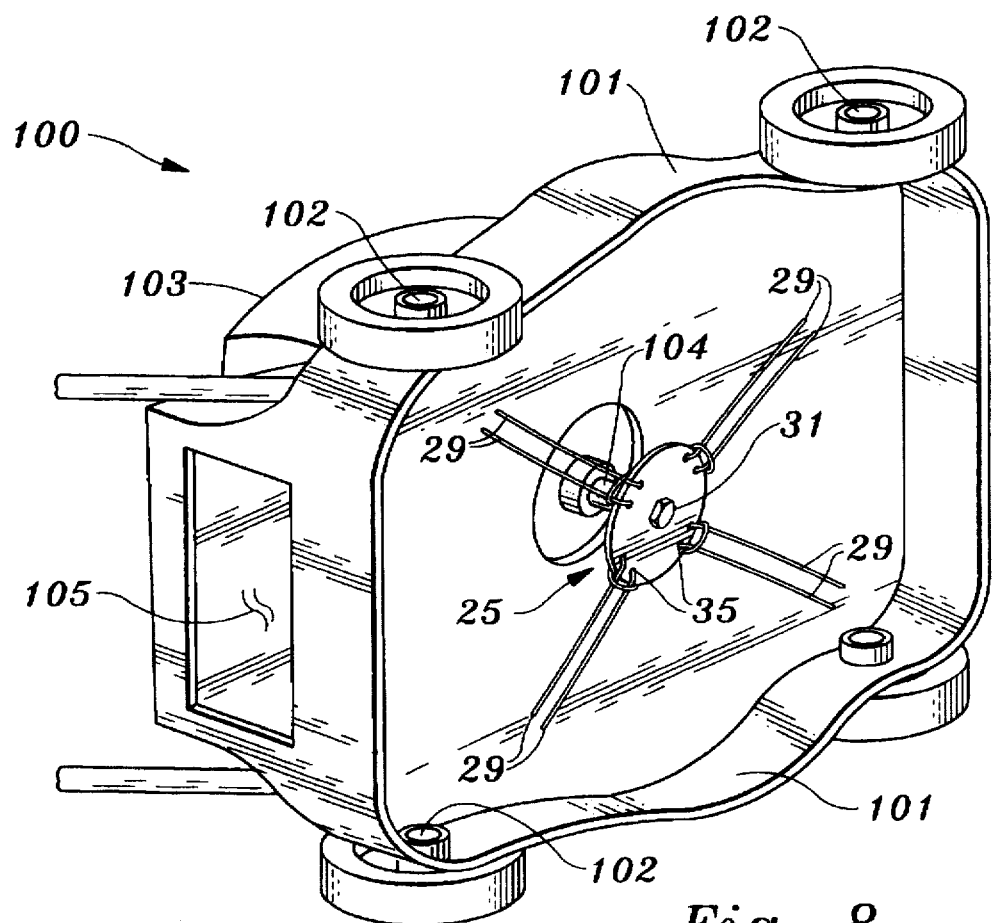
FIG. 8 is a bottom perspective view of a powered lawn mower wherein the blade has been replaced by a cutter assembly of this invention.

As seen in FIG. 1, a weed cutter 10, comprises a control section 11, mounted on the upper end of an elongated angularly disposed tube, 13. The wiring to the controls, not seen, are disposed within the elongated angular tube. The elongated angular tube is connected at its opposite, i.e., lower end to the cutter portion, 15 of the apparatus.

In FIG. 2, it is seen that tube 13, is threadedly engaged to a tube receiver 17 mounted on or within a housing which comprises a cover 19. Cover 19 serves as a safety shield to prevent both access to the cutting head and to prevent stones from flying up by deflecting them and clods of dirt as well. The motor 21 may be disposed either above or below the cover as may be desired. In FIG. 4, it is seen to be disposed below the cover and above the bumphead 23. The cutter assembly 25 comprises a cutting disk 27, also seen in FIGS. 6 and 7, to which is attached a series of flexible cutting members 29. The assembly 25 also includes a mounting bolt 31 which is seen in FIGS. 4 and 5 for disposition through central aperture 33 of the cutter disk.

It is to be noted in FIG. 4 that a conventional bumphead 23 has been retained physically connected to the drive shaft, not seen of the motor 21. It is also to be gleaned from FIG. 4 and other figures that there is no string present on the bump head shown in FIG. 4. It can be concluded therefore that the cutter assembly 25 may be conventionally connected to the drive shaft of the motor 21 as by bolting, after removal of the bumphead. Either way, the operability and operation of the cutter assembly of this invention is the same.

The invention of this application comprises a cutter assembly 25, as noted previously. Cutter assembly 25 includes a cutting disk 27, preferably of a diameter between about 4 to 6 inches, and having a plurality of sets of spaced apertures 35 at uniform spacing around the periphery of the cutting disk 27. A lawn mower cutter assembly—more about which will be discussed infra—can have four such aperture pairs, while a trimmer preferably has only two opposed pairs of apertures.

The pairs of apertures are on 0.5 inch centers from each other, and each aperture of the pair is sized in cross section to achieve a tight friction fit with the threaded through flexible member. Thus for 0.155 inch diameter flexible members, an aperture diameter of about 190/1000ths inch is suggested. The center of each aperture should be no closer than about 3/8ths inch from the edge 37 of the disk.

The cutting instrument utilized with this invention is a copolymer monofilament flexible member 29 as seen in FIG. 5. This member 29 is inserted through an aperture such as 35A or 35B through one face of the disk—usually up from the bottom face for ease of operation—then looped over the edge of the disk 37, and down through the second aperture of the pair from the top face and then outwardly directed away from the disk such that the two ends are of substantially even length. A reverse feeding of the line is also contemplated to be within the scope of the invention, and is equally as satisfactory.

In the alternative a flexible member 29 may be placed through the pair of apertures 35 and retained in place by a clip 41 that grasps the flexible member in two locations to retain the flexible member.

Reference is made to the bottom perspective view of a power lawn mower, 100 with the handle missing in FIG. 8. The mower 100 depicted here is a conventional lawn mower having a housing 101, to which four wheels are mounted on axles 102, to permit movement over the ground. The mower includes a motor 103 mounted on the top of the housing and which motor has a shaft 104 which extends down through said housing. The cutter assembly of this invention 25 is bolted or otherwise connected to said shaft as is shown in FIG. 8. A conventional exit chute 105 is seen to be the point of attachment of a collection bag not shown.

Here it is seen that the cutting disk 27 is attached in like manner to the drive shaft by a bolt 31. Operation is the same. Centrifugal force makes the individual flexible members extend outwardly during rotation of the cutting disk 27, and upon impact with upstanding grass, they cut the crass down to a lower elevation. Thus it is seen that the cutter assembly of this invention can be used with any type of vegetation for the control of growth.

The flexible member employed is preferably of a diamond cross-section and is at least about 0.155 inches in diameter. The diamond shape causes either a flat surface to impact the weed or grass or a very thin edge much like a knife to do so. The exact nature of the section of the member causing impact to any particular weed or plant will depend on the orientation of the flexible member within the pair of apertures 35. Either way, better cutting is achieved than if the flexible member were to be of a circular cross section.

The preferred copolymer material is sold by Desert Extrusions Inc. of Phoenix, Ariz. as their product designated copolymer 0.155 line. Flexible members about 20 inches in total length for this invention may be cut from long spools sold in the marketplace by this vendor.

The cutting disk or whirling disk of this invention may be made of aluminum, or a nonrusting steel, or other suitable material such as polycarbonate. The central aperture 33 may be about 3/8ths inch in diameter.

It has been mentioned that when the cutter assembly of this invention is used in a lawn mower more, namely 4 pairs of uniformly spaced apertures 35 may be employed. The reason that more aperture sets may be employed for a lawn mower than for a trimmer is due to the fact that a lawn mower has more horsepower to its engine and therefore has more capability to drive an increased number of pairs of lines under load.

Figure 9:
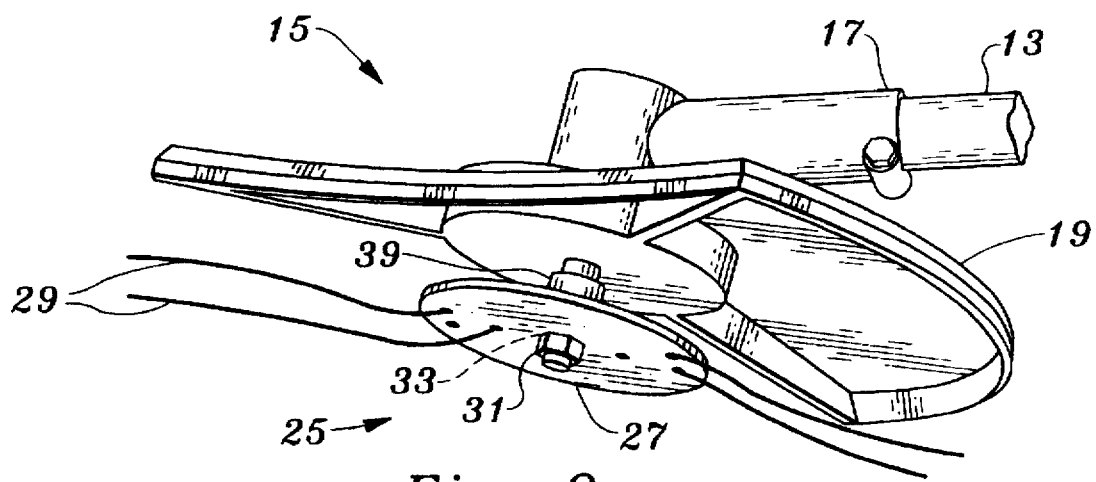
FIG. 9 is a top perspective view showing the cutting head of this invention mounted directly to the drive shaft.

In FIG. 9, the cutter assembly of this invention is shown mounted directly to the drive shaft 39, of a Ryobi™ weed cutting apparatus. That is, the bumphead 23 which is not employed with this invention has been removed.

The cutter assembly 25 here too comprises a cutting disk 27, also seen in FIGS. 6 and 7, to which is attached a series of flexible cutting members 29, not seen here. The assembly 25 as noted, also includes a mounting bolt 31, only a portion being seen, for insertion into disk aperture 33.

There are many benefits to be gained from using the cutter assembly of this invention in a weed cutter. Whereas most bumpheads for trimmers today cost retail between $19.00 and $25.00, the cutter assembly of this invention can be made to sell retail for under $12.00. The reason for the big price advantage for the apparatus of this invention is that bumpheads contain one or more springs to retain the spool of line in place. Unfortunately for gardeners, all too often these springs come out and disappear during the course of a change of line spool. This necessitates the purchase of an entire bumphead.

In contrast, there is no big spool of thin line for the instant invention, only the few flexible members easily attached to the rotating disk. The apparatus of this invention is not costly to assemble and as such can have a lower pricing structure.

Whereas the line of a bumphead is consumed in direct correlation to use of the conventional string trimmer since each time the bump head is tapped to the ground, more line is dispensed. Here each flexible member, once attached can easily last a full day without replacement, even if required to cut through weeds having a diameter of a half inch as can happen when weeds go unchecked.

As mentioned earlier, the cutter assembly of this invention can be used either directly attached to the motor of a trimmer or indirectly attached, with the bumphead retained in place. If the latter approach is employed as shown in the drawings here, the line holder when empty is not replaced, or an employ line holder can be retained within the bumphead as may be required due to the nature of the construction of any particular bump head. Thus the bumphead when present, serves only as an intermediate physically present component.

The fixed line head of this invention is relatively lighter in weight than the spool head of a standard trimmer. This reduces wear and tear on the motor and clutch of the tool. A result that arises from the lower weight of the head is that the motor can reach its maximum RPM output quicker.

Since certain changes may be made in the above described apparatus without departing from the scope of the invention herein involved, it is intended that all matter contained in the above description and shown in the accompanying drawings shall be interpreted as illustrative and not in a limiting sense.

I claim:

1. An apparatus comprising a powered device for cutting vegetation, which device comprises a housing having a motor mounted thereto, with a threaded drive shaft extending through said housing for attachment to a primary cutter assembly, which primary cutter assembly comprises:

a single flat cutting disk having a top surface and a bottom surface, and having a central bore for the receipt of a mounting bolt, a plurality of pairs of uniformly spaced apertures disposed at the same radius around the periphery of said cutting disk, said central bore and said apertures communicating between the top surface and the bottom surface of said disk, each of which pairs of apertures has a flexible cutting member secured there through, and directed away from said cutting disk, and a bolt securing said cutting disk to said drive shaft, wherein the cutting disk of the primary cutter assembly is disposed substantially normal to the drive shaft when mounted thereto, whereby upon actuation of the motor, centrifugal force causes the flexible member to extend outwardly from said cutting disk to an operative position substantially normal to the drive shaft for impact upon vegetation.

2. In the apparatus of claim 1 wherein the powered device is a lawn mower, and further wherein both ends of each flexible cutting member extend outwardly to a cutting position during motor actuation.

3. In the apparatus of claim 1 wherein the powered device is a trimmer, and further wherein at least one end of each flexible cutting member extends outwardly to a cutting position during motor actuation.

4. An apparatus comprising a powered device for cutting vegetation, which device comprises a housing having a motor mounted thereto, with a threaded drive shaft extending through said housing for attachment to a primary cutter assembly, which primary cutter assembly comprises:

a single flat cutting disk having a top surface and a bottom surface, and having a central bore for the receipt of a mounting bolt, at least two pairs of uniformly spaced apertures disposed at the same radius around the periphery of said cutting disk, said central bore and said apertures communicating between the top surface and the bottom surface of said disk, each of which pairs of apertures has a flexible polymeric cutting member secured there through, and directed away from said cutting disk, and a bolt securing said cutting disk to said drive shaft, wherein the cutting disk of the primary cutter assembly is disposed substantially normal to the drive shaft when mounted thereto, whereby upon actuation of the motor, centrifugal force causes the flexible member to extend outwardly from said cutting disk to an operative position substantially normal to the drive shaft for impact upon vegetation.

5. In the apparatus of claim 4 wherein the powered device is a lawn mower, and further wherein both ends of each flexible cutting member extend outwardly to a cutting position during motor actuation.

6. In the apparatus of claim 4 wherein the powered device is a trimmer, and further wherein at least one end of each flexible cutting member extends outwardly to a cutting position during motor actuation.

* * * * *